United States Patent
Tang et al.

(10) Patent No.: US 8,183,808 B2
(45) Date of Patent: May 22, 2012

(54) MOTOR OVERLOAD PROTECTING METHOD

(75) Inventors: Xiaohua Tang, Shenzhen (CN); Zhiyong Du, Shenzhen (CN); Ting Luo, Shenzen (CN)

(73) Assignee: BYD Co., Ltd., Shenzhen (CN)

( * ) Notice: Subject to any disclaimer, the term of this patent is extended or adjusted under 35 U.S.C. 154(b) by 323 days.

(21) Appl. No.: 12/683,623

(22) Filed: Jan. 7, 2010

(65) Prior Publication Data
US 2010/0177451 A1     Jul. 15, 2010

(30) Foreign Application Priority Data
Jan. 9, 2009    (CN) .......................... 2009 1 0000797

(51) Int. Cl.
*H02H 7/085* (2006.01)
(52) U.S. Cl. .......................................... 318/434; 361/31
(58) Field of Classification Search .......... 318/430–434, 318/565, 567, 619; 361/23–34
See application file for complete search history.

(56) References Cited

U.S. PATENT DOCUMENTS

| | | | | |
|---|---|---|---|---|
| 4,490,656 A | * | 12/1984 | Arnold | 318/434 |
| 6,380,706 B1 | * | 4/2002 | Kifuku et al. | 318/434 |
| 6,992,448 B2 | * | 1/2006 | Fujimoto et al. | 318/400.02 |
| 7,042,180 B2 | * | 5/2006 | Terry et al. | 318/400.21 |

* cited by examiner

*Primary Examiner* — Bentsu Ro
(74) *Attorney, Agent, or Firm* — Brinks Hofer Gilson & Lione

(57) ABSTRACT

A motor overload protecting method includes (a) detecting an instantaneous motor current value in real-time, calculating a current integral value in each of a corresponding integral period, and resetting the current integral value to 0 at an end of the integral period, (b) obtaining an overload coefficient according to the current integral value, which is greater than or equal to 0 and less than 1 when the current integral value is greater than or equal to a maximum motor current value, and is equal to 1 when the current integral value is less than the maximum motor current value, wherein the maximum motor current value is a maximum current integral value when the motor is in a non-overload condition; and (c) multiplying the instantaneous motor current value by the overload coefficient to obtain a new input current value, and operating the motor according to the new input current value.

9 Claims, 2 Drawing Sheets

MOTOR OVERLOAD PROTECTING METHOD

CROSS-REFERENCE TO RELATED APPLICATIONS

This application claims priority to and benefit of Chinese Patent Application Serial No. 2009-10000797.4, filed Jan. 9, 2009.

BACKGROUND OF THE INVENTION

1. Field of the Invention

The present invention relates to a motor overload protecting method, and in particular, relates to a control method for protecting the motor before the motor becomes overloaded.

2. Background of the Related Art

Electric motors are widely used in various fields. Sometimes the motor does not work properly under the rated power, and may become overloaded. The motor may fail due to overheating when overloaded. However, such heating is not generated instantly, and typically increases over a period of time.

Such motors have different anti-overload capabilities under different ranges of current. A mechanical overload relay is used for protecting the motor when an overload condition occurs. The mechanical overload relay interrupts power to the motor when the current value is larger than a maximum motor current value. Protecting the motor by this way is limited because it depends on the hardware components utilized, and such hardware components generally degrade over time or are otherwise adversely affected by chemical reactions and/or corrosion. This results in a loss of the overload protection.

Other known components used for protecting the motor include a current generating device, which generates the present current for controlling motor. The current generating device estimates the absolute or relative time value determined by the present current value. The absolute or relative time value is used for generating control information to the control motor. Protecting the motor in this way also has limitations because the motor cannot be controlled precisely by forecasting the time.

SUMMARY OF THE INVENTION

The present invention provides a motor overload protecting method to protect the motor from failure when the current fluctuates widely.

A motor overload protecting method includes (a) detecting an instantaneous motor current value in real-time, calculating a current integral value in each of a corresponding integral period, and resetting the current integral value to 0 at an end of the integral period, (b) obtaining an overload coefficient according to the current integral value, which is greater than or equal to 0 and less than 1 when the current integral value is greater than or equal to a maximum motor current value, and is equal to 1 when the current integral value is less than the maximum motor current value, wherein the maximum motor current value is a maximum current integral value when the motor is in a non-overload condition; and (c) multiplying the instantaneous motor current value by the overload coefficient to obtain a new input current value, and operating the motor according to the new input current value.

The motor overload protecting method according to one aspect protects the motor more effectively than known methods. Failure of the motor due to overheating caused by overload is avoided. Also, large current spikes can be filtered out. Further, the overload coefficient can be adjusted according to the current integral value to control the input of the motor more precisely. The method is simpler and more agile than known methods, and does not depend on the hardware.

BRIEF DESCRIPTION OF THE DRAWINGS

The aforementioned features and advantages of the invention as well as additional features and advantages thereof will be more clearly understood hereinafter as a result of a detailed description of embodiments when taken in conjunction with the drawings.

DESCRIPTION OF THE EMBODIMENTS

Figure 1:
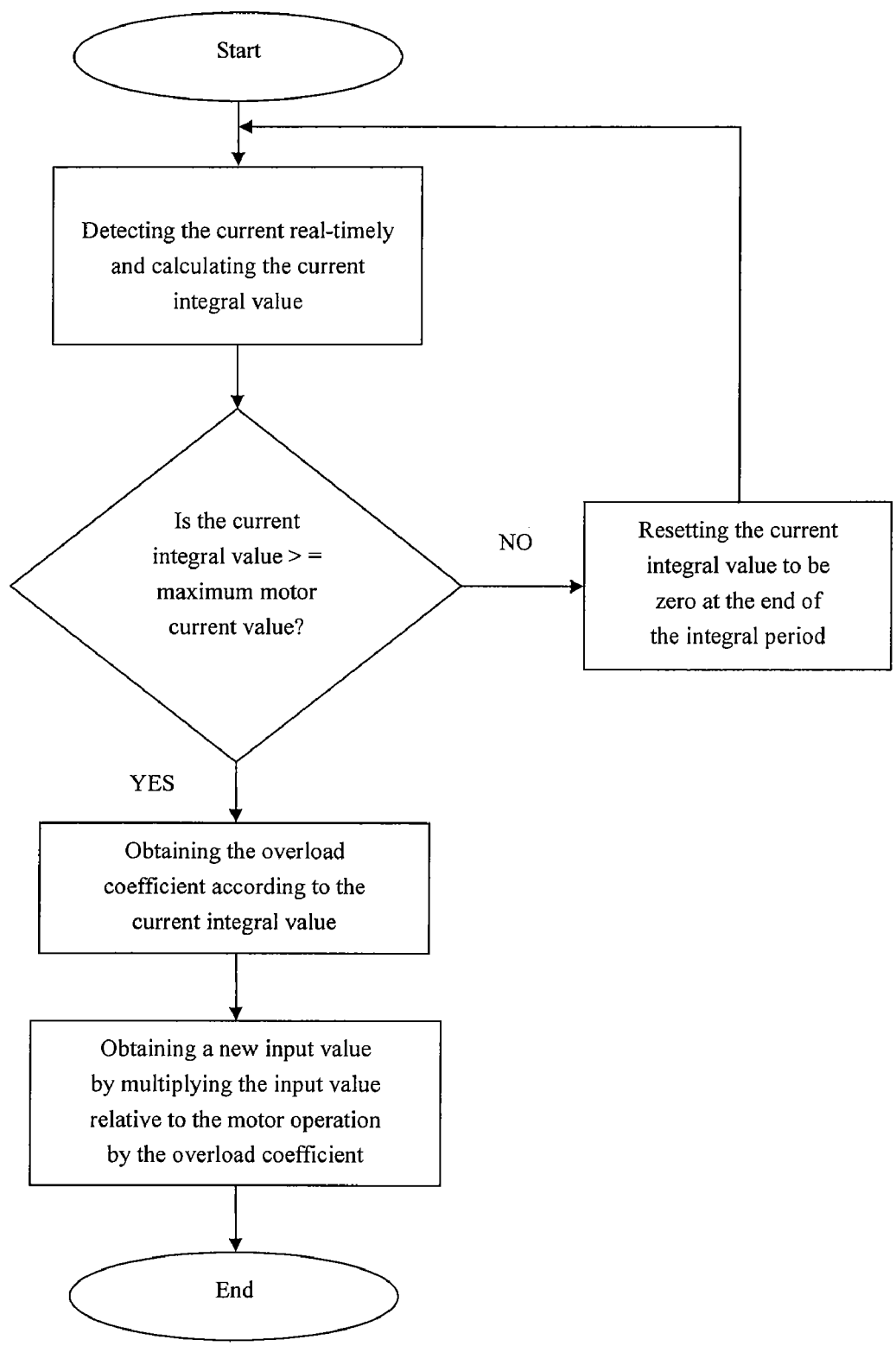
FIG. 1 is the flow chart illustrating the motor overload protection method.

As shown in FIG. 1, the motor overload protecting method includes (a) detecting an instantaneous motor current value in real-time, calculating a current integral value in each of a corresponding integral period, and resetting the current integral value to 0 at an end of the integral period, (b) obtaining an overload coefficient according to the current integral value, which is greater than or equal to 0 and less than 1 when the current integral value is greater than or equal to a maximum motor current value, and is equal to 1 when the current integral value is less than the maximum motor current value, wherein the maximum motor current value is a maximum current integral value when the motor is in a non-overload condition; and (c) multiplying the instantaneous motor current value by the overload coefficient to obtain a new input current value, and operating the motor according to the new input current value.

In step (a), the motor current is detected in real-time, and the current integral value is calculated in every integral period. If the current integral value is less than the maximum motor current value in an integral period, meaning that the motor is not overloaded, the current integral value is reset to zero and another integral period is begun.

If the current integral value is larger than or equal to the maximum motor current value, meaning that the motor is overloaded, then step (b) is performed. Because the motor current is detected in real-time, damage to the motor due to the overheating resulting from overloading the motor, is avoided. Also, large current spikes can be filtered out to avoid malfunction of the motor.

In step (b), if the current integral value is larger than or equal to the maximum motor current value, the overload coefficient is obtained according to the current integral value when the current integral value is larger than or equal to the maximum motor current value. The input of the motor is controlled by adjusting the overload coefficient according to the current integral value.

According to a preferred embodiment of the present invention, step (b) includes setting the maximal current integral value as the maximum of the current integral value whenever the current integral value is larger than or equal to the maximum motor current value, and obtaining the overload coefficient according to the maximum of the current integral value. Whenever the current integral value is larger than or equal to the maximum motor current value, the adjusted overload coefficient is obtained according to the maximum of the current integral value in real-time, so as to control the input of the motor.

When the motor is overloaded, the maximum of the current integral value is recorded and compared with the current integral value in the present integral period. The larger value is set as the renewed or adjusted maximum of the current integral value. When the present integral period is over, the current integral value is reset to zero, the renewed maximum of the current integral value is saved, and the next integral period begins.

When the motor is overloaded, the current integral value is compared in real-time with the maximum of the current integral value. If the current integral value is larger than the maximum of the current integral value, the current integral value is set as the renewed maximum of the current integral value. If the current integral value is less than or equal to the maximum of the current integral value, the maximum of the current integral value is not changed.

The overload coefficient is looked up in a table, which is built based on experimental data regarding the relationship between the current integral value and the overload coefficient, and the relationship between the current integral value and the overload cooling time.

In a preferred embodiment, step (b) further includes reducing the overload coefficient if the present current integral value is less than or equal to the maximum of the current integral value and is larger than or equal to the maximum motor current value. The reduction range of the overload coefficient is a revised value, which is less than the overload coefficient, and is larger than or equal to zero. The revised value decreases when the overload coefficient increases and the revised value increases when the overload coefficient decreases. For example, when the overload coefficient is 0.8, the revised value is 0.02. When the overload coefficient is 0.4, the revised value is 0.1. Thus, the current can be reduced to be less than the maximum motor current value in the least amount of time.

In step (c), a new input value is obtained by multiplying the input value relative to the motor operation by the overload coefficient. The motor is then actuated to operate under the new input value. The motor current is reduced by multiplying the input value by the overload coefficient so that the motor is not overloaded. The inputs of the motor are the current, the voltage or the power of the motor rotor. The preferred range of the integral period is 10-100 milliseconds.

Figure 2:
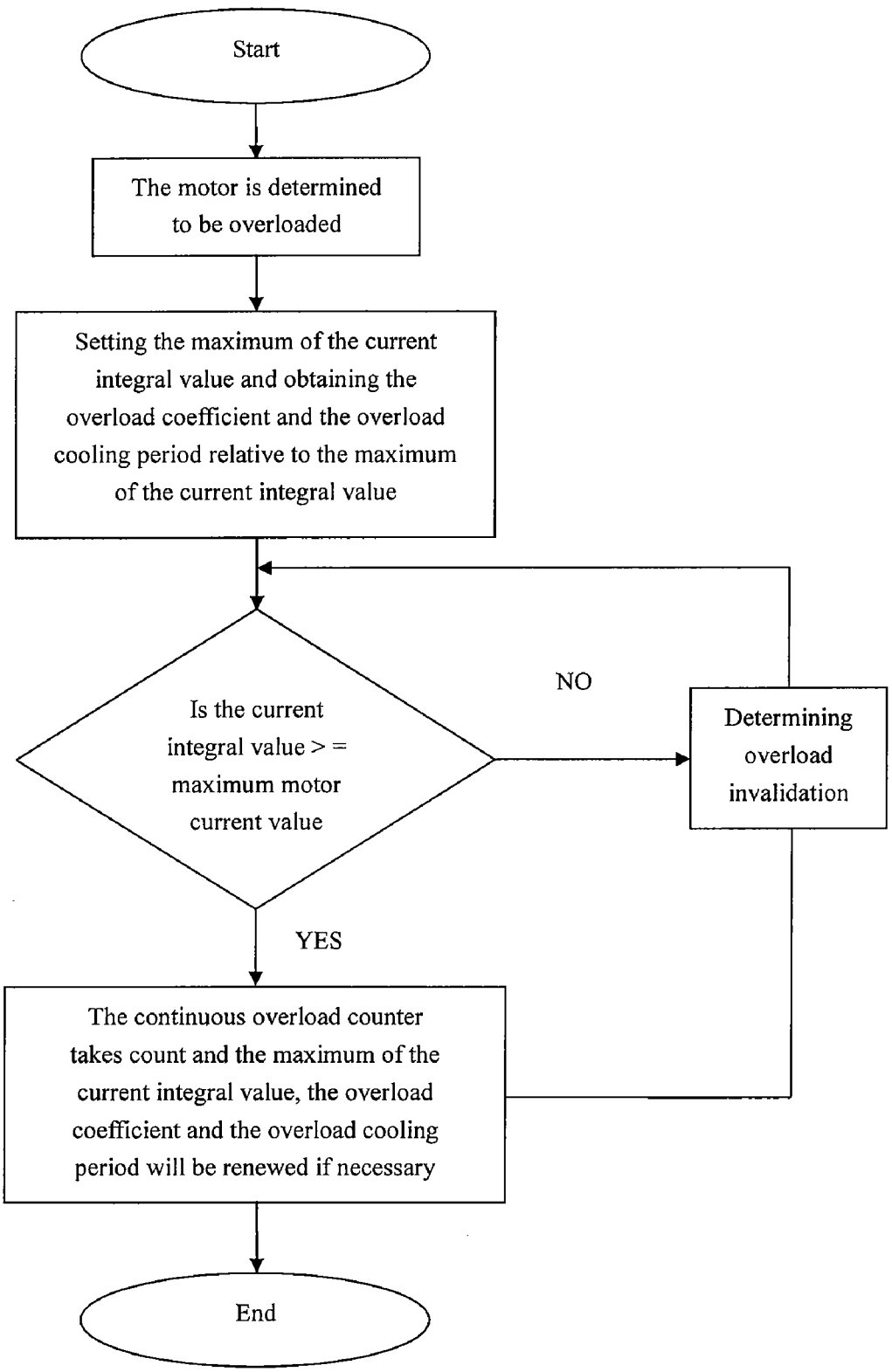
FIG. 2 is the flow chart illustrating a preferred embodiment of the overload protection method.

FIG. 2 is a flowchart illustrating a preferred embodiment. As shown in FIG. 2, the motor current integral value of three phases is detected real-time. If the current integral value is larger than or equal to the maximum motor current value, the current integral value is set as the maximum of the current integral value and the motor is determined to be overloaded. A continuous overload counter begins to count. At the same time, the present current integral value is compared with the maximum of the current integral value in the continuous detection.

When the present current integral value is larger than the maximum of the current integral value, the present current integral value is set as the renewed maximum of the current integral value, and the overload coefficient is looked up in the table. If the present current integral value is less than or equal to the maximum of the current integral value and larger than or equal to the maximum motor current value, the maximum of the current integral value is not renewed and the overload coefficient is reduced by the revised value described above.

In a preferred embodiment, the method further includes step (d) where the overload coefficient is set to a value of one within a 30-300 milliseconds time period if the current integral value remains at a value less than the maximum motor current value throughout a predetermined overload cooling period. The predetermined overload cooling period is at least as long as one integral period, wherein the predetermined overload cooling period increases when the maximum of the current integral value increases and the predetermined overload cooling period decrease when the maximum of the current integral value decreases. Thus, the overload coefficient can be reset when the motor is working normally (non-overloaded) and the motor is protected.

If the motor is overloaded again within the predetermined overload cooling period, the overload cooling period is set as the renewed predetermined overload cooling period. The above steps are repeated and overload cooling begins until the current integral value is less than the maximum motor current value. If the current integral value is always less than the maximum motor current value, the overload coefficient is reset to a value of one within about 30-300 milliseconds.

In another embodiment, the method further includes (e) turning off the motor if the current integral value at the end of the integral period is greater than or equal to the maximum motor current value more than 2000 times in a 10 second period of time, or if the overload coefficient is renewed to a value of one, and occurs more than 10 times for overload protection in a 2 minute period of time. If either of the two above conditions are met, an overload condition is declared and the motor is turned off.

In another embodiment, a continuous overload counter and an overload counter are used for recording the overload times. The continuous overload counter records how many times the current integral value is larger than or equal to the maximum motor current value when the integral period is over. The overload counter records how many times the function of overload protection acts until the overload coefficient is reset to a value of one. The continuous overload counter is incremented if the current integral value is larger than or equal to the maximum motor current value when the integral period is over. As a preferred embodiment, the motor is turned off if the value of the continuous overload counter is larger than 2000 within a 10 second interval. Otherwise, the continuous overload counter is reset to be zero.

When the function of overload protection is activated, if the current integral value is less than the maximum motor current value, the continuous current counter is reset to zero, and detection continues. If the overload coefficient is reset to one, the overload protection process terminates, and the overload counter is incremented. The overload counter records how many times the overload protection terminates. If the value of overload counter is larger than ten in a time period of two minutes, the motor is turned off. Otherwise, the overload counter is reset to zero. The above values of the time period and number of occurrences may vary depending upon the motor system.

The motor overload protecting method can effectively protect the motor from overload conditions and damage due to the heat resulting from an overload condition. Also, large current spikes can be filtered out to prevent malfunction of the motor. Further, the overload coefficient can be adjusted according to the current integral value to control the input of the motor more precisely. The method is simple and agile and does not depend on the hardware components.

The principles of the various embodiments described herein is therefore illustrative and not restrictive, the scope of the invention being indicated in the appended claims and all variations which come within the spirit and meaning of the claims are intended be embraced therein.

What is claimed is:

1. A motor overload protecting method, comprising:
   (a) detecting an instantaneous motor current value in real-time, calculating a current integral value in each of a corresponding integral period, and resetting the current integral value to 0 at an end of the integral period;
   (b) obtaining an overload coefficient according to the current integral value, which is greater than or equal to 0 and less than 1 when the current integral value is greater than or equal to a maximum motor current value, and is equal to 1 when the current integral value is less than the maximum motor current value, wherein the maximum motor current value is a maximum value of the current integral value when the motor is in a non-overload condition; and
   (c) multiplying the instantaneous motor current value by the overload coefficient to obtain a new input current value, and operating the motor according to the new input current value.

2. The method according to claim 1, wherein the step (b) comprises:
   setting the maximum value of the current integral value as a maximum recorded value when the current integral value is larger than or equal to the maximum motor current value, and obtaining the overload coefficient according to the maximum recorded value.

3. The method according to claim 2, wherein the step (b) further comprises:
   reducing the overload coefficient if the current integral value is less than or equal to the maximum of the current integral value and if the current integral value is greater than or equal to the maximum motor current value.

4. The method according to claim 3, wherein the reduced overload coefficient is a revised value, which is less than the overload coefficient and is larger than or equal to 0, wherein the revised value decreases when the overload coefficient increases, and the revised value increases when the overload coefficient decreases.

5. The method according to claim 2, further comprising:
   (d) gradually adjusting the overload coefficient to a value of 1 within a time interval of 30-300 milliseconds if the current integral value is less than the maximum motor current value throughout a predetermined overload cooling period, wherein the predetermined overload cooling period is at least one integral period in length.

6. The method according to claim 5, wherein the predetermined overload cooling period increases when the maximum of the current integral value increases, and the predetermined overload cooling period decreases when the maximum of the current integral value decreases.

7. The method according to claim 5, further comprising:
   (e) turning off the motor if the current integral value at the end of the integral period is larger than or equal to the maximum motor current value for more than 2000 occurrences within in 10 second period, or if the overload coefficient is adjusted to a value of 1 more than 10 times within a 2 minute period.

8. The method according to claim 1, wherein the range of the integral period is 10-100 milliseconds.

9. The method according to claim 1, wherein input parameters relative to the motor operation include the new input current value of the motor stator, a voltage of the motor stator, and a power of the motor stator.

* * * * *